United States Patent [19]
Robinson

[11] Patent Number: 4,860,575
[45] Date of Patent: Aug. 29, 1989

[54] APPARATUS FOR TESTING WATER JACKETS ON CYLINDER HEADS OF INTERNAL COMBUSTION ENGINES

[75] Inventor: Robert C. Robinson, Cleveland, S.C.

[73] Assignee: Dover Cylinder Head Service, North Charleston, S.C.

[21] Appl. No.: 218,540

[22] Filed: Jul. 13, 1988

[51] Int. Cl.⁴ ........................................ G01M 15/00
[52] U.S. Cl. .................................................. 73/49.7
[58] Field of Search ....................................... 73/49.7

[56] References Cited

U.S. PATENT DOCUMENTS

| | | | |
|---|---|---|---|
| 3,360,984 | 1/1968 | Salsbury et al. | 73/49.7 |
| 3,608,369 | 9/1971 | Wilkinson | 73/49.7 X |
| 3,751,978 | 8/1973 | Crawford | 73/49.7 |
| 3,973,429 | 8/1976 | Durgan et al. | 73/49.7 |
| 4,157,028 | 6/1979 | Moffett, III | 73/49.7 |
| 4,171,636 | 10/1979 | Bergeron | 73/49.7 |
| 4,213,328 | 7/1980 | Roeschlaub et al. | 73/49.7 |
| 4,594,882 | 6/1986 | Wheeler | 73/49.7 |
| 4,617,824 | 10/1986 | Cybulski et al. | 73/49.7 |

*Primary Examiner*—Stewart J. Levy
*Assistant Examiner*—Joseph W. Roskos
*Attorney, Agent, or Firm*—Dority & Manning

[57] ABSTRACT

Apparatus for testing heads of internal combustion engines of various sizes for fluid tightness of the internal cavities in the head. The apparatus includes a generally rectangular retaining frame which is pivotally supported on two vertical end members of a base for pivotal motion about a longitudinal axis. A head support frame is supported by the retainer frame for movement towards and away from the retainer frame. Spaced pneumatic cylinders move the support frame towards and away from the retainer frame. Each of the frames have a plurality of transverse members whose spacing is adjustable to provide support and retention for engine heads of various sizes. The testing apparatus includes a test plate having internal cavities to match those of the engine head being tested. The plate and engine head are clamped together and sealed by means of a gasket between the head and the test plate while they are clamped between the support frame and the retainer frame. The test plate has means for admitting air under pressure whereby the internal cavities of the test plate and of the engine head are subjected to air under pressure. While under pressure the engine head is rotated about the axis of the retainer frame while a soapy solution is applied to the engine head so that any leaks of air from the internal cavities might be detected.

11 Claims, 5 Drawing Sheets

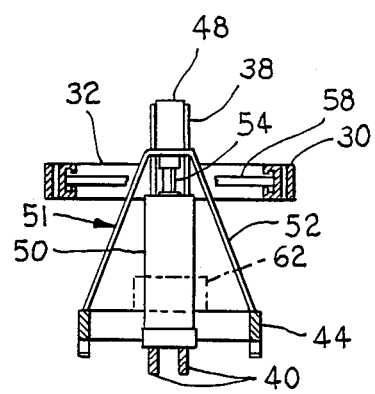
Fig.4-A.
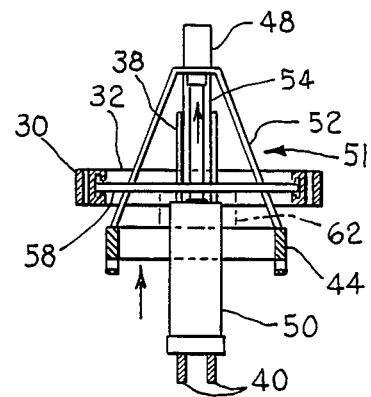
Fig.4-B.
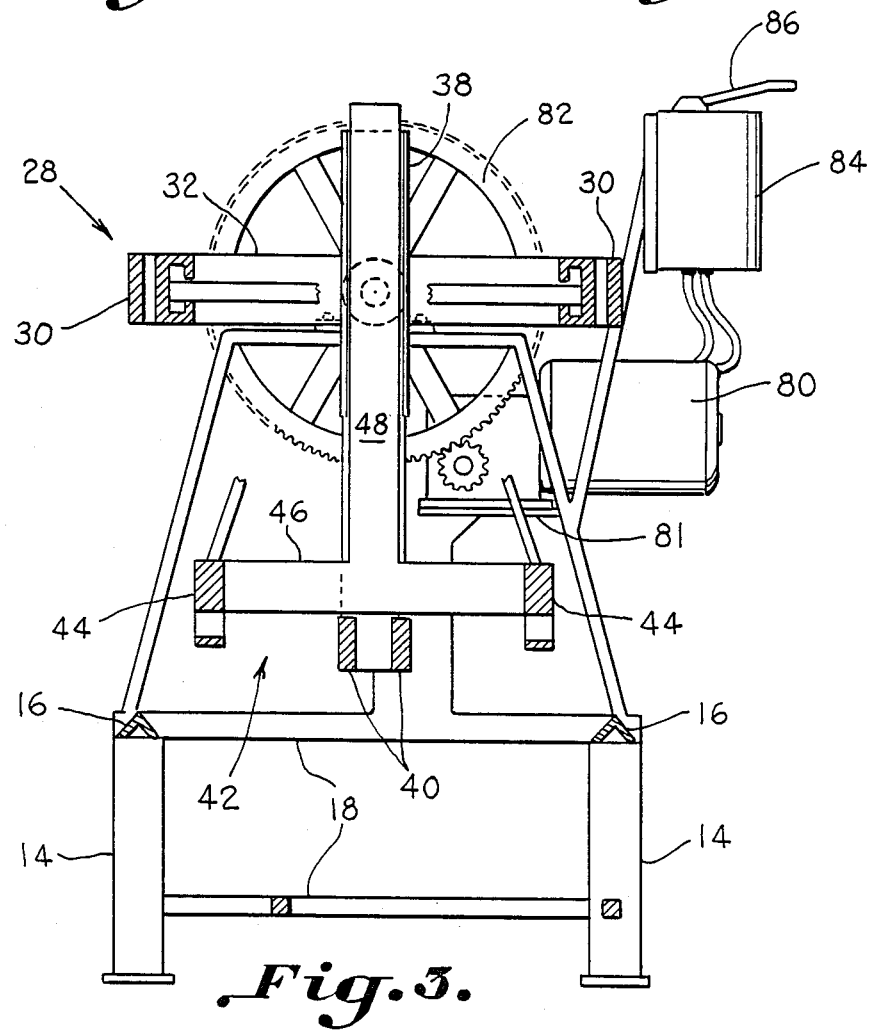
Fig.3.

APPARATUS FOR TESTING WATER JACKETS ON CYLINDER HEADS OF INTERNAL COMBUSTION ENGINES

BACKGROUND OF THE INVENTION

This invention relates to a new and useful apparatus for testing heads or blocks of internal combustion engines for leaks from the water passages of the blocks or heads.

The heads of internal combustion engines, and particularly those of large diesel engines, are extremely complex structures which have numerous internal coolant, air, or fuel mixture passages. During operation leaks and cracks may develop in the walls of the head which separate the many internal cavities, and if this occurs a detrimental intermixing of coolant, gas, fuel, antifreeze, lubricating oil and other additives can occur. Regularly scheduled spectophotometer analysis of oil samples from such engines indicates the seriousness of leakage and when engine repairs are in order, but when this is known the leaks are still very difficult to locate in practice.

The engine head must be removed from the engine and the openings which connect the internal coolant cavities in the head with the remaining cavities in the engine block must be plugged, and either compressed air or hot water under pressure must then be introduced to the coolant cavity in an attempt to locate any cracks or leaks between the coolant cavity and any of the other cavities or passages in the engine head.

Engine heads come in many different sizes and in numerous different patterns of cavities, passages, and ports, so sealing all of the necessary ports and openings requires a variety of plates, plugs and the like.

The problem of locating leaks and cracks in the engine heads is compounded by the fact that some leaks show up only when the cavity is filled with water or other coolant at relatively high temperatures and under a pressure comparable to that at which the system operates in service. It is both dangerous and difficult to initially locate leaks and cracks in the head by means of hot water under pressure since a bad crack can spray scalding water around the test area.

One attempt to provide an engine head test stand is found in U.S. Pat. No. 3,608,369. In this patent the engine head is supported by a frame which is pivotably mounted on folding legs, similar to those of a saw horse, with a pressure actuated hold down means for engaging the top side of the engine head. A plurality of upstanding sealing elements are provided on the support for sealing the openings in the engine head while a liquid conduit is carried on the hold down means for sealing the inlet opening of the engine head when the pressure means is actuated. The conduit carried on the hold down frame, automatically aligns itself with the water inlet opening on the engine head to circulate water through the engine head. A pair of valves are provided to permit escape of air in the engine head upon the initial introduction of water into the coolant chamber of the head. The test stand permits the engine head support to be rotated manually for inspection. The test device shown in this patent is adequate for small engine heads but is cumbersome for the heavy ones and requires considerable effort in sealing up all of the openings in the engine head. Furthermore, the head must then be rotated manually while the operator tries to inspect the head at the same time. This is difficult when heavy engine heads are tested. Furthermore, the pressurized hold down means is centered in the rack and may or may not effect complete sealing throughout the length of the hold down frame.

Another approach to providing a portable universal apparatus for use in pressure testing engine heads and blocks is found in U.S. Pat. No. 4,157,028. In this device the engine head is mounted or supported on a frame and a plurality of sealing members are placed over all of the surface openings of the cylinder head or block, leading to the cooling jacket. Retaining bars are then manually placed over these sealing members and extend longitudinally of the engine head. A plurality of clamping units are then attached directly to the engine head and apply clamping pressure to the clamping bars in a direction to effect airtight engagement of the sealing members with the surface openings of the cooling jacket. While this device may be adequate for some engines, it is very slow and cumbersome since each of the retaining bars must be individually clamped, by screwing the clamping members down with wrenches or the like. Furthermore, no provision is made for rotating the support for the block or head in this patent.

Still another approach for solving this problem is found in U.S. Pat. No. 4,617,824. In the device shown in this patent, clamping plate cross bar members, clamping members connected to the cross bar members, and clamping screws threaded onto the clamping members, clamp the clamping plate towards the cross bar members, thereby compressing the water passage port sealing plugs positioned between the surface of the cylinder head and the clamping plate, to seal the water passage ports. An air pressure source, a liquid source, and a pump are connected to a diversion valve, and an outlet of the valve supplies air or liquid under pressure as selected to the cylinder head inlet tubes at a water passage port. The cylinder head outlet tubes with an outlet valve are connected to another water passage port. The apparatus disclosed in this patent is effective but very cumbersome and slow in utilization. Furthermore, heavy engine blocks or heads are still very difficult to handle in this device.

Another approach for testing engine blocks or heads is found in U.S. Pat. No. 3,360,984. This patent discloses an apparatus for testing engine cylinder heads which includes adjustable rails for providing a support for manually operated clamps having slidable adjusting movement longitudinally and transversely of the supporting rails, so as to position an associated pressure applying screw in operative relation with the underlying closure member for a port opening in the cylinder head being tested. In an alternative arrangement the clamp includes a toggle mechanism for swinging the pressure applying screw into and out of its operative position of use. In this device each of the closure members must be separately and independently adjusted and closed as with some of the other approaches this is a very time consuming, slow process.

Still another approach is found in U.S. Pat. No. 3,973,429. This patent discloses apparatus for testing engine heads of various sizes for fluid tightness of the internal cavities in a head which communicates with ports in the fire deck surface of the head. A universal mounting frame for the cylinder head is rotatable on a longitudinal pivot axis to position the head with its fire deck surface at any orientation relative to the axis. The device includes longitudinal support rails, positioned above the water ports and spring loaded stopper means and fluid supply and venting members which are longitudinally adjustable on the rails for alignment with the ports. The support rails then are moved down manually to push the entire array of stoppers and fluid couplings into sealing engagement with the fire deck surface and the rims of the ports. Again, this device is cumbersome in use and time consuming.

SUMMARY OF THE INVENTION

It is an object of the invention to provide engine head testing apparatus which is adapted to test a variety of engine head configurations, quickly and accurately.

It is another object of the invention to provide an apparatus which is capable of handling heavy engine heads during the testing procedure.

It is still another object of the invention to provide a testing apparatus for testing a variety of engine heads of varying configurations and weights and sizes, quickly and accurately.

The above objects, and others which will become apparent hereinafter, are accomplished by providing an apparatus having a rectangular retaining frame, which is pivotably supported on a base member to pivot about a longitudinal horizontal axis. A head supporting frame is provided in association with the rectangular frame and for pivoting therewith for supporting the engine head during the testing operation. The support frame is provided with a plurality of lateral adjustable supports making it adjustable to support various sizes of engine blocks, and the retaining frame is provided with a plurality of adjustable retaining members for retaining and holding the engine head during the testing operation. The head supporting frame is provided with, and partially supported by, spaced pneumatic cylinders for moving the support frame towards the retaining frame to effectively clamp the engine head between the retaining elements and the supporting elements.

A test plate, which has a plurality of openings which communicate with the fluid openings in the engine head being tested, is placed between the top of the engine head and the retaining elements and includes a gasket at the interface between the test plate and the surface of the engine head being tested. This test plate is clamped in fluid communicating relationship with the engine head by moving the support frame towards the retaining frame by pressurizing the pneumatic cylinders until the test plate is in sealing communication with the surface of the engine head.

The test plate is provided with a valve for admitting air under pressure for the testing operation. Once the head and test plate are clamped together between the supporting frame and the retaining frame, the test plate is pressurized by air under a predetermined pressure, and motorized means rotate the test frame about its longitudinal axis to permit visual inspection of the head as the head is rotating within the test stand. At the same time, a liquid containing soap or the like is sprayed onto the cylinder so that any air escaping from the cylinder will be readily noticed by the operator as the head rotates about its longitudinal axis.

BRIEF DESCRIPTION OF THE DRAWINGS

The invention will now be described in conjunction with the appended drawings, in which:

FIG. 3 is a vertical cross-sectional view of the test stand shown in FIG. 1 taken along line III—III;

FIGS. 4a and 4b are sectional views of the test stand of FIG. 1 showing the movement of the support frame towards the retaining frame;

DETAILED DESCRIPTION OF THE DRAWINGS

Figure 1:
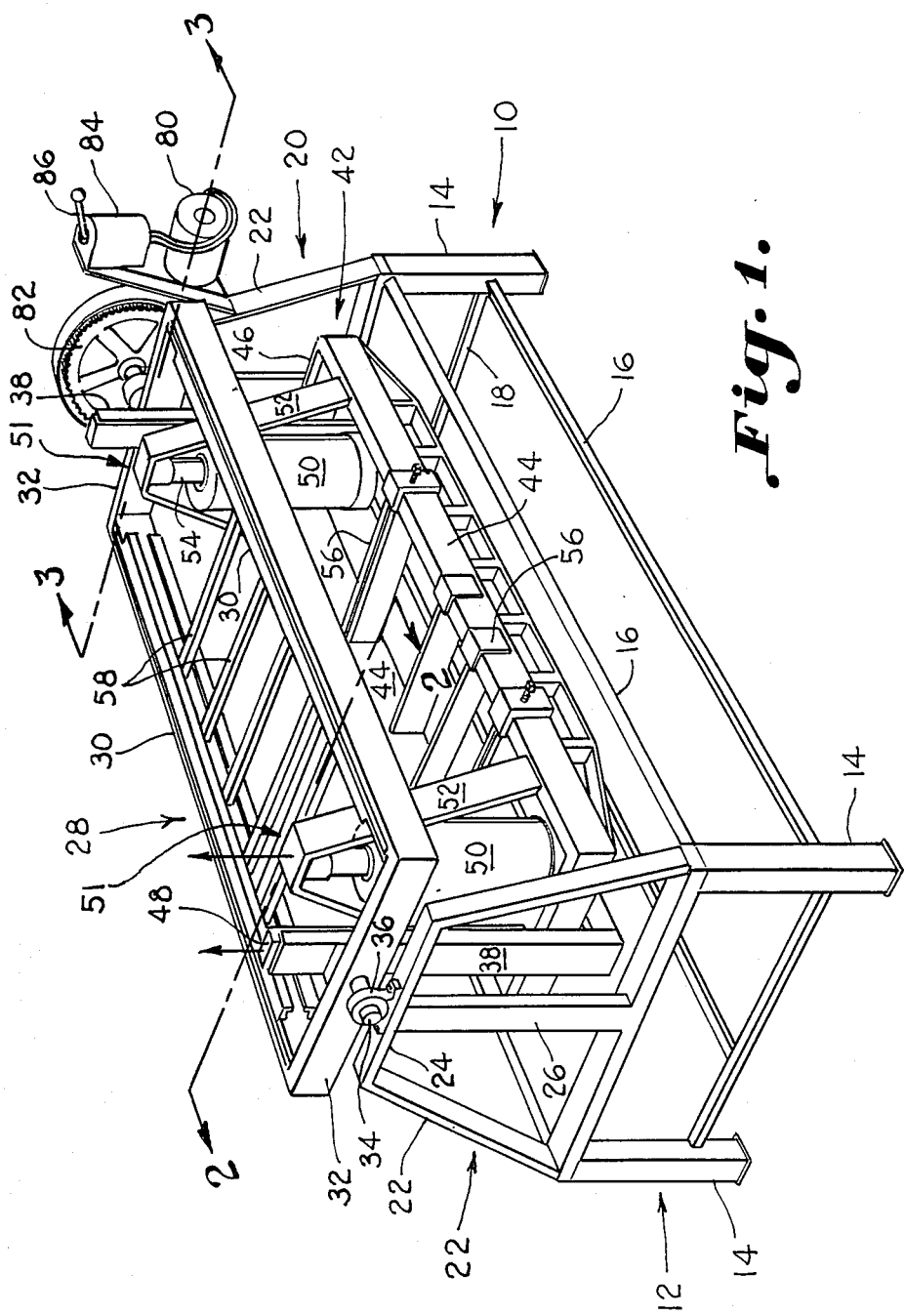
FIG. 1 is a perspective view of a test frame of the invention.

Referring now to FIGS. 1, 2, 3, and 4 of the drawings where a preferred embodiment of the invention is illustrated. The head testing apparatus 10 comprises a base 12 which has legs 14 connected by upper and lower side members 16 and upper and lower end members 18 at each side and at each end to form a sturdy stationary support base for the head testing apparatus.

On each end of base 12 supported by the upper end frame member 18 is a truncated triangular arch 20 which is comprised of two angled side frame members 22 and a top horizontal frame member 24. Additionally, a vertical support member 26 extends from the upper surface of end member 18 to the lower surface of the top horizontal frame member 24 to offer additional support to the arch.

An upper rectangular retaining frame 28, comprising a pair of side members 30 connected by a pair of end members 32, is supported on the truncated arches of each end of the base by means of an axle 34, which is affixed to the center of end frame members 32. Axles 34 are supported by a bearing arbor 36 on each end, mounted on the top of horizontal frame member 24 of the truncated arch. Arbor 36 is supplied with suitable bearings to permit frame 28 to pivot about its longitudinal axis.

Attached to the inside surfaces of each end member 32 of frame 28 is a U-shaped channel member 38 which extends, on its lower end, down to a point adjacent to the top of base 12. Affixed to the bottom end of U-shaped channel members 38 is a longitudinal support member 40. U-shaped channel members 38 and longitudinal support member 40 are affixed to retaining frame 28 for rotation therewith.

A head support frame 42 is disposed within the dimensions of retaining frame 28 and comprises a pair of side members 44, which are connected to each end by end members 46. Each end member 46 has affixed thereto a vertical guide member 48 which is disposed within the U-shaped channel member 38 for sliding movement therein when the retaining frame 28 is in the upper horizontal position, as shown in FIG. 1.

A pair of spaced pneumatic cylinders 50 are disposed on longitudinal support member 40, one adjacent each end of support frame 42. Each of the pneumatic cylinders 50 has associated therewith a truncated triangular support arch 51 which is affixed at its upper end to the piston rod 54 of the pneumatic cylinder. The side members 52 of the truncated triangular support arch are affixed to the side members 44 of the head support frame 42. Whenever pneumatic cylinders 50 are pressurized, piston rod 54 moves upwardly as seen in FIG. 1 bringing the head support frame 42 in closer relationship to the retaining frame 28, as illustrated in FIG. 4 of the drawings.

Head support frame 42 is provided with a plurality of lateral head support bars 56 which have yokes 57 for anchoring the support bars in place on the side members 44 of head support frame. The position of these support bars 56 is adjustable so as to provide for heads of different dimensions.

Figure 2:
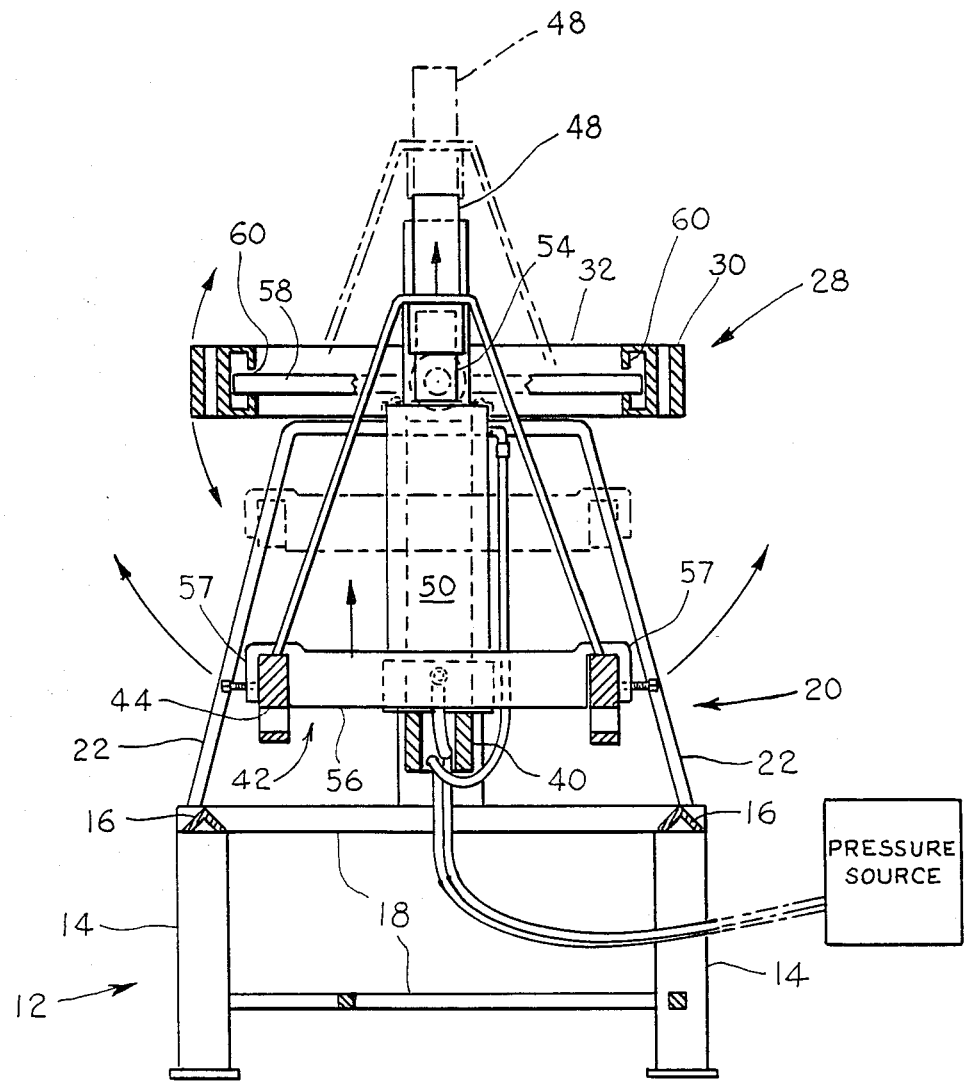
FIG. 2 is a vertical cross-sectional view of the apparatus of FIG. 1 taken along line II—II in FIG. 1.

Upper retaining frame 28 comprises side members 30 which have a T-shaped groove or slot 60 for retaining T-shaped ends 59 of lateral head retaining bars 58, as seen in FIGS. 2 and 4. The position of the retaining bars 58 are adjustable so as to permit the retaining frame to accommodate engine heads of various sizes and dimensions.

Figure 5:
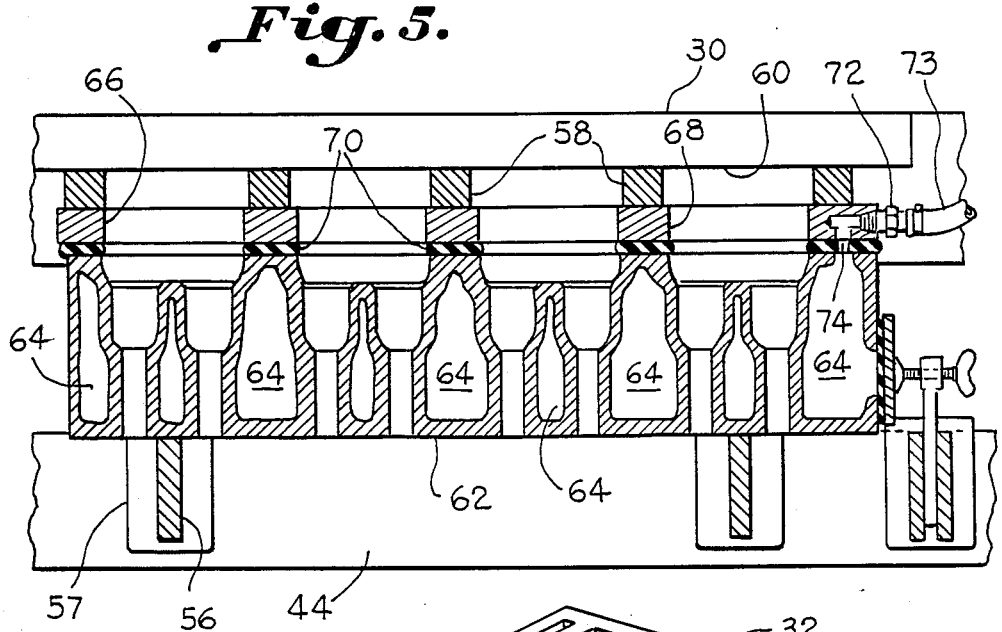
FIG. 5 is a schematic longitudinal cross-sectional view of an engine head supported, along with its test plate, in clamping relationship between the support frame and the retaining frame.

Referring now to FIG. 5 of the drawings wherein an engine head 62 is diagrammatically illustrated being supported by lateral head support bars 56. Disposed between head 62 and retaining bars 58 is a test plate 66 which has a plurality of internal cavities 68 which mate with and match the internal cavities 64 of engine head 62. Test plate 66 is provided with a gasket 70 which also has openings to match the internal cavities of the engine head being tested and is disposed between the engine head and the test plate 66. Normally the gasket 70 will be bonded to the test plate 66.

Test plate 66 has a fluid inlet port 72 on one end which is connected to a fluid supply line 73, which in turn, is connected to a source of air under pressure. Fluid inlet port 72 is in fluid communication with the cavities in the test plate through fluid passageways 74.

In operation the support frame 42 supports the head to be tested and a suitable matching test plate 66 is placed on top of the head to be tested. The pneumatic cylinders 50 are pressurized to raise the support frame 42, thereby bringing the test plate 66 into contact with the retainer bars 58, securely clamping the test plate into abutting contact with the upper surface of the head 62.

As seen in FIGS. 1 and 3, axle 34 on the head end of the testing device 10 is affixed to a large head gear 82 which is driven by a reversible motor 80 supported on a reversible motor support 81. The direction of rotation of frames 28 and 42 about axles 34 is controlled by a control device 84 with a control lever 86. During the testing process the operator clamps the engine head 62 and its test plate 66 between the retaining frame 28 and the support frame 42 and saturates the combined head and test plate with a soapy water solution and pressurizes the internal cavity 64 of the head by admitting air under pressure through port 72. At the same time he operates the control lever 86 to cause the head to rotate slowly about axles 34 so that the entire head can be inspected in a very short period of time.

Figure 6:
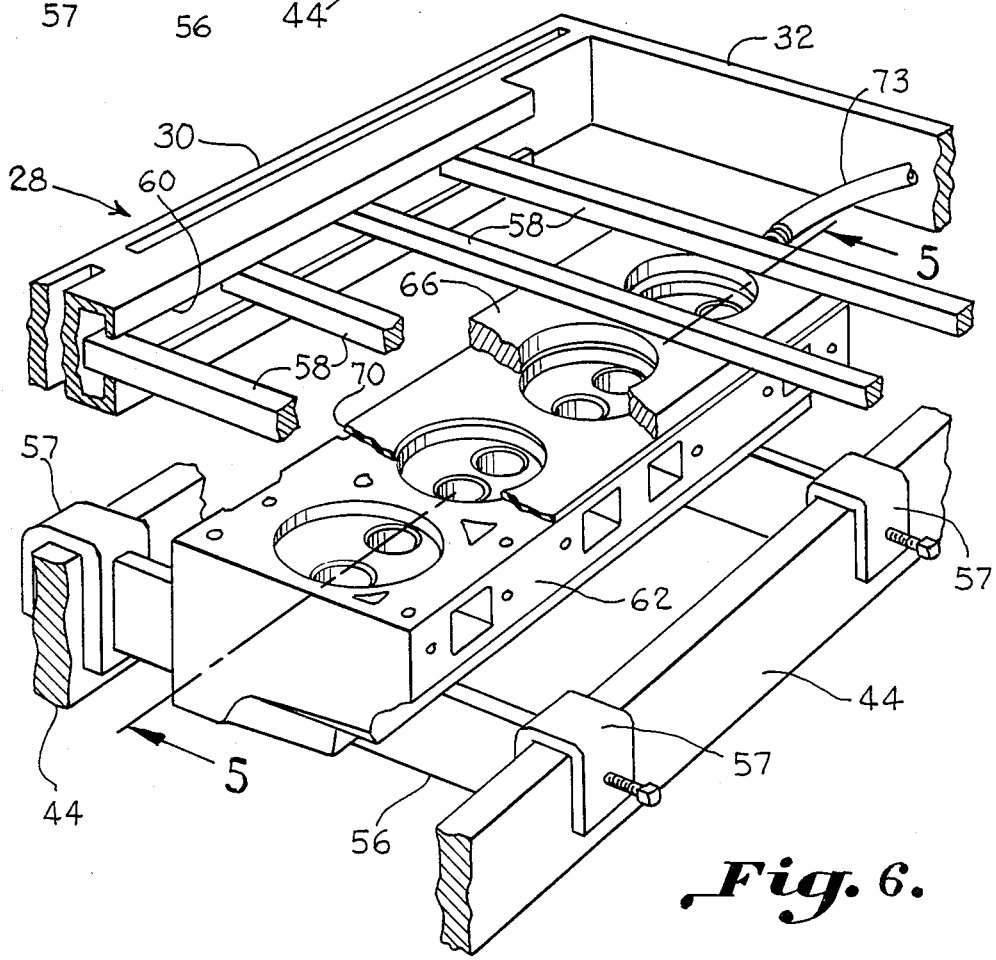
FIG. 6 is a perspective view of the test plate used in testing the apparatus of the invention.
Figure 7:
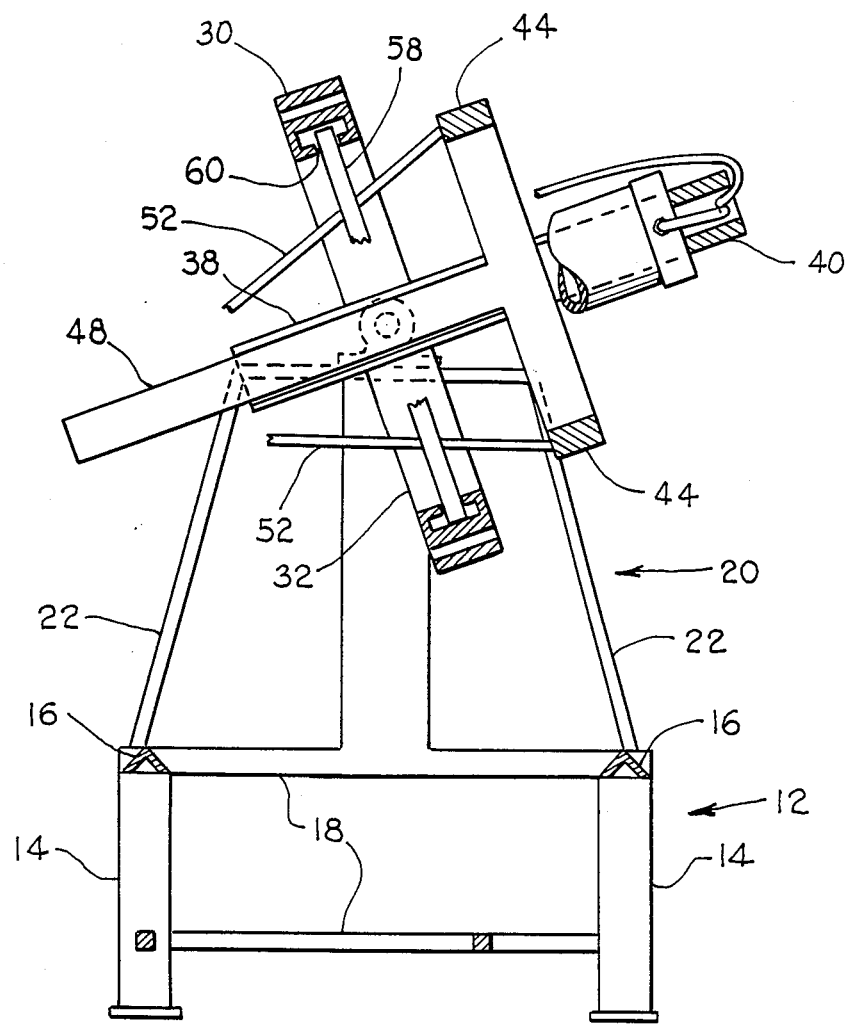
FIG. 7 is a vertical cross-sectional view as in FIG. 3, with the retaining frame rotated.

FIG. 6 illustrates test plate 66 in perspective. It is to be understood that this plate is shown by way of example, and its configuration will vary with the configuration of the engine heads to be tested. It is to be understood that test plate 66 as illustrated is merely an example of a number of test plates that may be used to test a variety of engine heads. A different test plate will be provided for each engine head to be tested.

It is to be understood that the example and structure of the invention illustrated herein is merely one embodiment and that variations therein can be made without departing from the scope of the invention as delineated hereinafter by the appended claims.

What is claimed is:

1. Apparatus for testing heads of internal combustion engines of various sizes and configurations for fluid tightness of internal cavities in said head, comprising:
   (a) a base having two vertically extending end frame members;
   (b) a generally rectangular retaining frame, pivotally supported on said end frame members for pivotal movement about a horizontal axis and having a plurality of adjustable retaining means extending transversely of said horizontal axis;
   (c) a head support frame extending parallel to said retaining frame, and supported by said retaining frame for relative movement towards and away from said retaining frame, and having a plurality of adjustable support means extending transversely of said supporting frame for supporting engine heads;
   (d) a test plate having a plurality of cavities to match the cavities in the engine head being tested and having a gasket interposed between the mating surfaces of said engine head and the adjacent surfaces of the test plate to seal said surfaces against fluid leakage, said test plate having a port for admitting fluid to the cavities in said engine head under pressure;
   (e) spaced pneumatic means for moving said head support frame towards said retaining frame to hold said test plate and said head in sealing contact with each other, between said adjustable support means on said head support frame and said adjustable retaining means on said retaining frame; and
   (f) means for supplying fluid under pressure to said cavity in said engine head, to test for defects in said head.

2. A testing apparatus as set forth in claim 1, wherein means are provided for rotating said retaining frame about its longitudinal axis.

3. A testing apparatus as set forth in claim 2, wherein said means for rotating the retaining frame comprises a motor.

4. A testing apparatus as set forth in claim 3, wherein said motor is a reversible motor.

5. A testing apparatus as set forth in claim 1, wherein said base is constructed of a plurality of spaced frame members whereby engine heads being tested are readily assessable to the view of the operator during the testing process.

6. A testing apparatus as set forth in claim 1, wherein said head support frame is maintained parallel to said retaining frame as it is moved towards and away from said retaining frame.

7. A testing apparatus as set forth in claim 1, wherein said vertical end frame members of said base are truncated arches.

8. A testing apparatus as set forth in claim 1, wherein said head support frame is narrower than said retaining frame.

9. A testing apparatus as set forth in claim 1, wherein said retaining frame has a transverse guide channel on each end and said head support frame has a transverse guide member for sliding within said channel.

10. A testing apparatus as set forth in claim 9, wherein the ends of said channels remote from said retaining frame and below said head support frame are connected by a longitudinal frame member which supports said spaced pneumatic means.

11. A testing apparatus as set forth in claim 10, wherein each, of said pneumatic means are connected to the head support frame by means of a truncated triangular arch.

* * * * *